United States Patent
Elias et al.

(10) Patent No.: US 9,854,047 B2
(45) Date of Patent: Dec. 26, 2017

(54) SERVICE POOL FOR MULTI-TENANT APPLICATIONS

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 378 days.

(21) Appl. No.: 13/770,736

(22) Filed: Feb. 19, 2013

(65) Prior Publication Data

US 2014/0237087 A1   Aug. 21, 2014

(51) Int. Cl.
   *G06F 15/16*       (2006.01)
   *H04L 29/08*       (2006.01)
   *H04L 12/16*       (2006.01)
   *H04L 12/24*       (2006.01)

(52) U.S. Cl.
   CPC .............. *H04L 67/16* (2013.01); *H04L 12/16* (2013.01); *H04L 41/5041* (2013.01); *H04L 67/02* (2013.01); *H04L 67/34* (2013.01)

(58) Field of Classification Search
   None
   See application file for complete search history.

(56) References Cited

U.S. PATENT DOCUMENTS

| | | | |
|---|---|---|---|
| 6,990,629 B1* | 1/2006 | Heaney | G06F 17/24 707/999.102 |
| 2003/0158918 A1* | 8/2003 | Hanis | G06F 9/465 709/220 |
| 2003/0191803 A1* | 10/2003 | Chinnici | G06F 9/547 709/203 |
| 2004/0117358 A1* | 6/2004 | von Kaenel | G06F 17/30241 |
| 2006/0200800 A1* | 9/2006 | Melby | G06F 8/24 717/114 |
| 2009/0320045 A1* | 12/2009 | Griffith | H04L 67/34 719/315 |
| 2011/0196866 A1* | 8/2011 | Cooper | G06F 17/30595 707/737 |
| 2012/0023576 A1* | 1/2012 | Sorensen | G06F 21/577 726/22 |
| 2012/0215775 A1* | 8/2012 | Allen | G06Q 30/02 707/728 |

* cited by examiner

*Primary Examiner* — Aftab N. Khan
(74) *Attorney, Agent, or Firm* — Lowenstein Sandler LLP

(57) ABSTRACT

A processing device receives a request from a client for a specific service. Responsive to determining that the specific service is not running, the processing device converts a previously instantiated generic service into the specific service. To perform the conversion, the processing device assigns the generic service from a service pool for the specific service and renames the generic service based on a name of the specific service. The processing device additionally queries a directory service for specific service logic associated with the specific service. The processing device receives at least one of the specific service logic or a reference to the specific service logic from the directory service, and updates the generic service to include at least one of the specific service logic or the reference to the specific service logic.

17 Claims, 6 Drawing Sheets

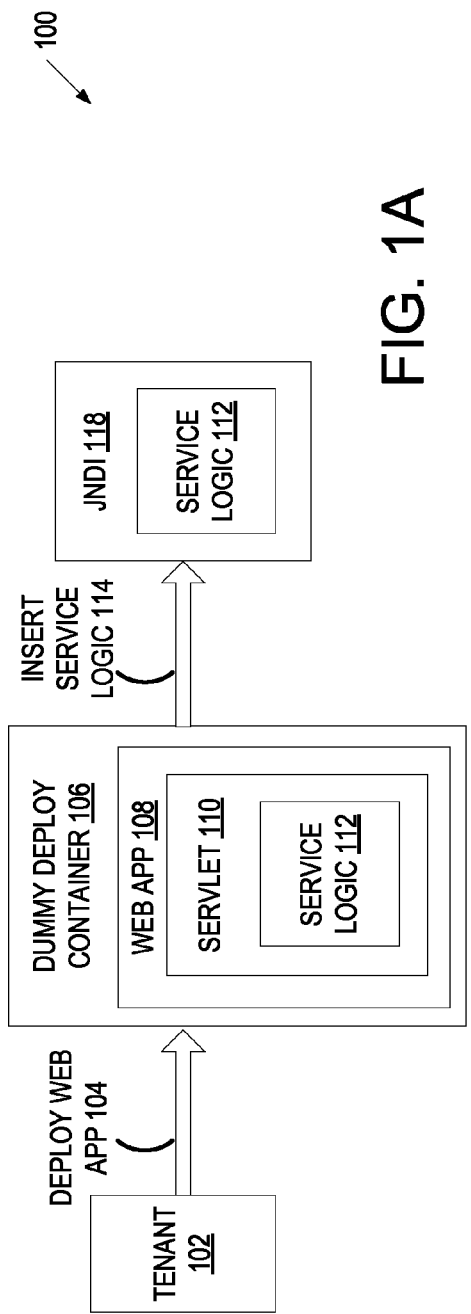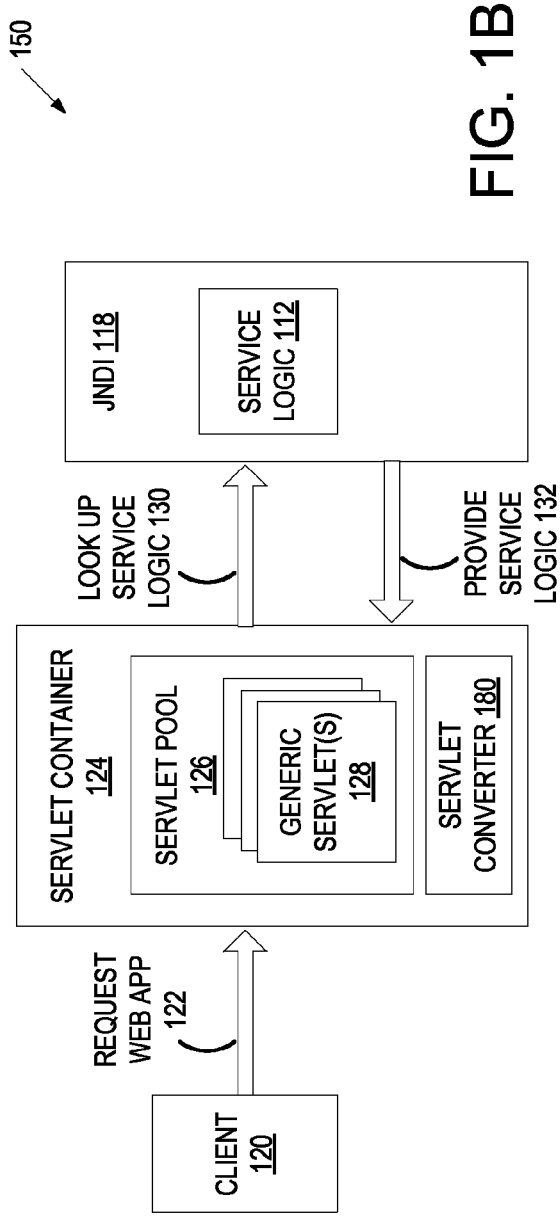

US 9,854,047 B2

SERVICE POOL FOR MULTI-TENANT APPLICATIONS

TECHNICAL FIELD

Embodiments of the invention relate generally to application provisioning, and more specifically to the provisioning of services from generic service pools.

BACKGROUND

In cloud computing environments, multi-tenant approaches may be used to provision any or all of hardware, middleware and applications. In multi-tenant approaches, a single instance of a resource is provided to multiple different clients (tenants). For each instance of middleware and/or applications that are to be provided to tenants, that instance is first instantiated and configured. The process of instantiating and configuring such instances may be time consuming and resource intensive.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 1A is a block diagram showing one implementation of service logic extraction.

FIG. 1B is a block diagram showing one implementation of converting a generic servlet into a specific servlet.

DETAILED DESCRIPTION

Figure 2:
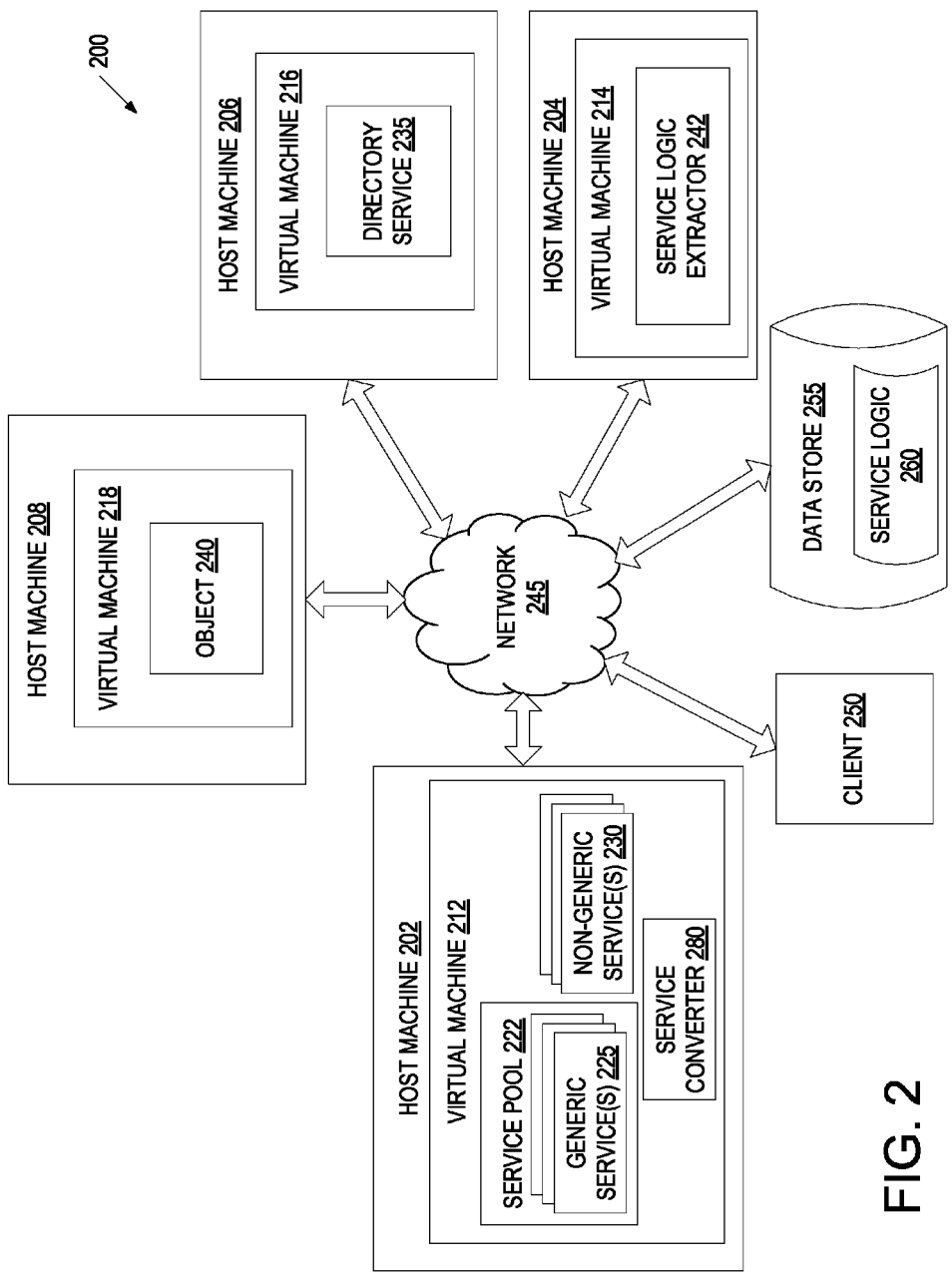
FIG. 2 is a block diagram of an example network architecture in which embodiments of the present invention may operate.

Embodiments of the invention describe a provisioning system that provisions services and applications in a multi-tenant environment. The provisioning may be performed in an automated manner, with little or no user interaction. In one embodiment, the provisioning system receives a request from a client for an application associated with a specific service. Responsive to determining that the specific service is not running, the provisioning system converts a previously instantiated generic service into the specific service. To convert the generic service into the specific service, the provisioning system assigns the generic service from a service pool for the specific service, the generic service having search logic. The provisioning system renames the generic service based on a name of the application. The provisioning system uses the search logic to query a directory service for specific service logic associated with the specific service. This specific service logic may have previously been extracted from a file originally containing the specific service. The provisioning system receives the specific service logic or a reference to the specific service logic from the directory service, and updates the generic service to include at least one of the specific service logic or the reference to the specific service logic. The previously generic service thereafter may function as the specific service.

The process of instantiating and configuring services may be a time consuming and resource intensive process. The resource utilization associated with instantiating and configuring a service may be performed before clients request such services. However, running services also consumes system resources. Accordingly, it is often impractical to keep all or even many of the different available services running in anticipation of future use. Embodiments provide generic services that can be modified into specific services with minimal additional processing or overhead. A pool of generic services may be maintained, and these generic services may be converted into specific services upon client request. This may reduce a time lag between when a client requests a service and when the client can begin using the service. Additionally, this may minimize the resource utilization associated with maintaining services.

Moreover, in multi-tenant cloud computing environments, tenants may be distributed across multiple time zones and/or may be associated with disparate businesses, each with varying business needs. Accordingly, at any given time particular services may not be in use (e.g., because it is midnight in the regions where those services are typically used). By using a pool of reusable generic services, the diverse and geographically disperse customer base and their varied use of resources may be leveraged to increase the tenants that can be served together on a fixed amount of resources.

FIG. 1A is a block diagram of a system 100 showing service logic extraction for a specific servlet. FIG. 1B is a block diagram of a system 150 showing conversion of a generic servlet into a specific servlet. FIGS. 1A and 1B are described with reference to one particular implementation in which servlets and the Java® naming and directory interface (JNDI) are used. However, it should be understood that embodiments also apply to other types of services, such as Java application programming interface (API) for RESTful web services (JAX-RS) services (where REST is an acronym for representational state transfer) or .NET services. Additionally, it should be understood that other types of directory services other than JNDI may also be used. For example, an Active Directory service or an eDirectory service may be used instead of a JNDI service.

Referring to FIG. 1A, system 100 includes a tenant 102, a dummy deploy container 106 and a JNDI service 118. The tenant 102 may be a computing device of a client organization. That client organization may wish to deploy an application (e.g., a web application (app) 108) for use by their clients. An operator of system 100 may provide a platform that can receive and execute the web application for the client organization. The platform may be provided as a platform-as-a-service (PaaS).

The tenant 102 deploys 104 the web application (app) 108 to dummy deploy container 106 of system 100. The web application 108 may be deployed as a single file that includes a servlet 110. The single file may be an archive file such as a servlet archive (SAR) file, a web application archive (WAR) file, a Java® archive (JAR) file, or some other file type. The file may be compressed, and may include a directory structure and one or more aggregated files (e.g., multiple Java class files), metadata and/or additional resources such as text, images, and so on.

Servlet 110 is a Java programming language class used to extend the capabilities of a server. Servlet 110 may be an object that receives requests and generates responses. Servlet 110 may process and store data (e.g., submitted from a hypertext markup language (HTML) form), provide dynamic content (e.g., such as the results of a database query), manage state information, and perform other operations. To deploy and run a servlet 110, the servlet 110 is conventionally loaded into a servlet container. The servlet container is a component of a server that interacts with servlets. The servlet container is responsible for managing a lifecycle of a servlet, mapping a universal resource locator (URL) to the servlet, ensuring that a URL requestor has correct access rights, and so on.

Dummy deploy container 106 mimics a conventional servlet container. In one implementation, dummy deploy container 106 is a wrapper around a conventional servlet container. Accordingly, it appears to tenant 102 that the web application 108 and its included servlet 110 are being deployed to a servlet container. If the web application 108 is received as a compressed file (e.g., an archive file), dummy deploy container 106 decompresses the file. Dummy deploy container then analyzes the contents of the web application 108 to identify any servlets (e.g., servlet 110). Servlets may have a specific class and/or structure, and may be identified based on this class/structure.

After a servlet 110 is identified, dummy deploy container 106 further analyzes the servlet 110 to identify service logic 112 within the servlet. In one implementation, dummy deploy container 106 browses the archive and identifies classes contained therein. Dummy deploy container 106 then extracts the service logic 112 from the servlet (e.g., from identified classes). In one implementation, dummy deploy container 106 extracts the code in methods annotated by any hypertext transport protocol (HTTP) methods (e.g., GET, POST, DELETE, HEAD, PUT, etc.). This may be performed by calling the methods of the identified classes. In one implementation, methods of classes are identified using Java reflection. Alternatively, dummy deploy container 106 may decompile the classes to extract code for methods (e.g., service logic) of a servlet.

Dummy deploy container 106 may combine the extracted code (service logic) into a single method. Dummy deploy container 106 may additionally create an object, and fill the object with the extracted method. The object may additionally include handling logic for receiving requests, determining methods (e.g., specific service logic) to use for the requests, and calling the determined methods.

Once service logic 112 has been extracted, dummy deploy container 106 accesses JNDI 118 (or other directory service), and inserts 114 the service logic 112 into JNDI 118. In one implementation, dummy logic container 106 inserts the generated object into JNDI 118. JNDI is a Java API for a directory service that allows clients to discover and look up data and objects via a name. JNDI may make use of servers, flat files and/or databases to store names and/or objects (e.g., objects including service logic 112). JNDI organizes names (e.g., of service logic) into a hierarchy. A name can be any string and/or an object that supports a particular name interface. A name may be bound to an object in the directory by storing either an object or a reference to the object in the directory service that is identified by the name.

An entry for the servlet 110 and/or web application 108 may be added to JNDI 118. The added entry may include the service logic 112 (e.g., an object including the service logic 112). Additionally or alternatively, the service logic 112 may be stored in a data store, and a reference to (e.g., a location of) the service logic 112 may be inserted into JNDI 118. In either case, any application or servlet may query JNDI 118 to gain access to the service logic 112 (e.g., to the object including the service logic).

In one embodiment, once service logic 112 is executed, a location of the executing service logic 112 is also added to the entry for the web application 108 and/or servlet 110 in JNDI 118. For example, the service logic may execute within a Java virtual machine (JVM), and the entry may include an address for the JVM. Therefore, servlets may use service logic 112 without actually including or executing the service logic 112.

Referring now to FIG. 1B, after service logic 112 (and/or a reference to service logic 112) has been added to JNDI 118, a client 120 requests access 122 to the web application 108. The request 122 is sent to a servlet container 124 of system 150. Servlet container 124 may be a web application platform that is shared by many different tenants, where each tenant may be a different client. The servlet container 124 may be presented to customers as a platform-as-a-service (PaaS). PaaS is a service model in which tools and libraries (e.g., such as servlet containers) are provided to a customer to enable the customer to create and run applications and services. For example, each customer may deploy their own specific servlets using the servlet container 124. With each new tenant, servlet container 124 allocates new servlet classes for the new tenant and manages servlet lifecycles for those servlets.

Servlet container 124 includes a servlet pool 126 of generic servlets 128. Each of the generic servlets 128 may contain standard servlet logic for receiving requests and responding to the requests as well as for performing session management. The generic servlets 128 may also contain configuration parameters and information on an execution environment. Additionally, the generic servlets 128 include search logic for accessing service logic of specific servlets.

Responsive to receiving the request for the web application, servlet container 124 allocates a generic servlet 128 from the servlet pool 126 for the servlet 110 of the web application 108 and servlet converter 180 renames the generic servlet so that it has a name associated with the web application. For example, servlet converter 180 may rename the generic servlet to have a name of the web application or of the specific servlet 110.

The allocated generic servlet 128 uses its search logic to look up 130 the service logic 112 for the specific servlet 110 from JNDI 118. Generic servlet 128 may send a query to JNDI that indicates the name of the web application 108. Example search logic may read as follows:

```
@Servlet(urlMappings={"/GenericServletl"})
public class MyServlet {
    @GET
    @POST
    public void handleGet(HttpServletRequest req,
        HttpServletResponse res) {
    InitialContext initialContext = new InitialContext ( );
    Context envContext = (Context) initialContext.lookup ("java:
    comp/env");
    HandlingLogic logic = (HandlingLogic) envContext.lookup
("logic/GenericServlet1Logic");
    logic.handle(req,res);
    }
}
```

JNDI 118 may then return the service logic or a reference to the service logic. If there is an executing object that includes the service logic, JNDI 118 may return a reference to that object (e.g., an address of the object). The executing object may be inside of a JVM on which the servlet container 124 is running, inside of a JVM on which the JNDI 118 is running, or inside of another JVM. The JVMs on which the servlet container 124, JNDI 118 and object run may be on the same machine or on different machines.

The servlet converter 180 inserts either the reference to the service logic (e.g., to an object including the service logic) or the service logic itself into the generic servlet 128. Accordingly, servlet converter 180 may dynamically connect a generic servlet to specific service logic of a specific servlet on demand. In one embodiment, the generic servlet 128 handles the insertion of the reference and/or service logic. After the insertion of the reference or logic into the generic servlet 128, the generic servlet is converted into a specific servlet that performs operations associated with the web application 108. If the service logic 112 is included in a remote object, the specific servlet sends requests to that object and receives responses from that object as specific service logic of the object is to be used.

Once the specific servlet is no longer used, servlet converter 180 may convert the specific servlet back into a generic servlet 128, and add the generic servlet 128 back into the servlet pool 126. Converting the specific servlet into a generic servlet 128 may include renaming the specific servlet so that it has a generic servlet name, and removing the service logic 112 or the reference to the service logic 112 from the specific servlet. The generic servlet 128 may then be reused for another web application. Alternatively, the specific servlet may be terminated, and a new generic servlet may be instantiated.

FIG. 2 illustrates an example network architecture 200 in which embodiments of the present invention may operate. The network architecture 200 includes multiple host machines 202-208 connected to a client 250 and a data store 255 via a network 220. The network 220 may be a private network (e.g., a local area network (LAN), wide area network (WAN), intranet, etc.), a public network (e.g., the Internet), or a combination thereof.

Each host machine 202-208 may be a computing device such as a desktop computer, laptop computer, rackmount server, router, switch, tablet computer, mobile phone, or any other type of computing device. Host machines 202-208 may include one or more processing devices, memory, and/or additional devices such as a graphics card, hardware redundant array of independent disks (RAID) controller, network controller, hard disk drive, universal serial bus (USB) device, internal input/output (I/O) device, keyboard, mouse, speaker, etc.

Each host machine 202-208 may include a virtual machine (VM) 212-218. In one embodiment, virtual machines 212-218 are Java virtual machines (JVMs). A JVM is a virtual machine configured to execute Java bytecode. A JVM may be implemented to run on an underlying operating system (OS) or may be implemented to run directly on hardware. A JVM provides a run-time environment in which Java bytecode can be executed. Each of the host machines 202 may include different hardware and/or different operating systems. However, the same Java applications may run within any of the JVMs on the different host machines 202-208.

In another embodiment, virtual machines 212-218 are virtual machines of a .NET framework (e.g., the ASP.NET framework). The .NET framework allows for the execution of .NET applications, typically on a Windows®-based web server. Much like Java Servlets, ASP.NET services provide dynamic content to a web server.

Host machines 202-208 may be connected to one or more data stores 255, which may be network data stores such as a storage area network (SAN), network attached storage (NAS) or cloud based storage (e.g., storage as a service (SaaS)). Alternatively, data store 255 may be connected directly to any one or more of the host machines 202-208.

Virtual machine 214 of host machine 204 includes service logic extractor 242. In one embodiment, in which services are servlets, service logic extractor 242 is a dummy servlet container. Service logic extractor 242 usually receives services in the form of archive files. Responsive to receiving an archive for a new service, service logic extractor 242 unpacks the archive and scans its contents. Service logic extractor 242 may search for service logic satisfying specific criteria. For example, service logic extractor 242 may analyze the contents of the unpacked archive file for classes that are servlets. Service logic extractor 242 may then analyze those classes to identify service logic (e.g., methods) with hypertext transport protocol (HTTP) request method designator annotations. Such methods may be methods with GET, POST, DELETE, HEAD or PUT annotations. Service logic that has such HTTP request method designator annotations may be extracted, while service logic that does not have HTTP request method designator annotations may not be extracted. Service logic extractor 242 may search for and extract such methods because callable methods have these annotations in the servlet specification. Other methods that are contained in a service's class may be automatically available at run time, and so extraction of such logic may be skipped.

In one embodiment, service logic extractor 242 creates an object that wraps all possible calls on a service. For example, the object may wrap all of the extracted service logic (e.g., all extracted methods) for the service. The object that wraps the specific service logic may additionally include handling logic, which may receive requests (e.g., from specific services), determine which methods to call and/or use to satisfy the requests, call the determined methods, and pass parameters from the request to the methods. Service logic extractor 242 then inputs extracted service logic into directory service 235 running in virtual machine 216 of host machine 206.

Directory service 235 in one implementation is a JNDI service. Alternatively, directory service 235 may be another type of directory service. Directory service includes a listing of names, where each name may be associated with an object that includes extracted service logic for a specific service.

Virtual machine 212 of host machine 202 includes a service pool 222 having a collection of generic services 225. The generic services 225 may have previously been instantiated for later conversion into specific services. Virtual machine 212 may additionally include one or more non-generic (or specific) services 230 and/or a service converter 280. Note that in an implementation in which services are servlets, service pool 222, non-generic services 230 and/or service converter 280 may run inside of a servlet container (not shown). The servlet container may be shared by multiple different tenants/clients in a multi-tenant environment. The servlet container and/or virtual machine 212 may maintain a list of running applications (e.g., a list of available generic services and running non-generic services).

Responsive to client 250 requesting a particular service, virtual machine 212 may first determine whether that particular service is already available. If so, and that particular service can support an additional tenant, the client 250 may be provided with access to that particular service. If the particular service is not available, service converter 280 allocates a generic service 225 from service pool 222 for the particular service.

Service converter 280 or the generic service 225 makes an inquiry to directory service 235 to request specific service logic of the particular service (e.g., an object containing one or more methods with the specific service logic) using a name of the particular service. In one embodiment, search logic included in the generic service 225 is used to make the inquiry. Directory service 235 may respond to the inquiry with the object containing the specific service logic or with a reference to the object (e.g., a reference to service logic 260 in data store 255).

Directory service 225 may also include a reference to an executing object 240 with the service logic 260. If no such executing logic is available, virtual machine 218 may load the object responsive to the inquiry for the specific service logic. This may be performed responsive to a request from the directory service 235 or service converter 280 to load the object, for example. Virtual machine 218 may update directory service 235 with information regarding the loaded object (e.g., a name and/or address of the object 240, a JVM on which the object is running, an internet protocol (IP) address of the host machine 208, etc.). Directory service 235 may report such information about the executing object to the service converter 280 and/or allocated generic service 225.

Service converter 280 may modify the allocated generic service 225 by inserting a reference to the service logic 260 and/or object 240 into the generic service 225. Alternatively, if service converter 280 received the service logic from the directory service 235, service converter 280 may add the service logic to the generic service and/or may load the object having the service logic. In either instance, the specific service logic is made available to the previously generic service. The specific service logic may be available, for example, via transmission control protocol/internet protocol (TCP/IP) and/or via direct calls in memory. If the service logic is included in an object running on a remote virtual machine (e.g., in VM 218), it may be accessed using a remote method invocation. Accordingly, the generic service is converted into a non-generic service 230 dynamically and on demand.

At any future time, service converter 280 may determine that a non-generic service 230 is no longer being used. Service converter 280 may then perform a process referred to herein as passivation, in which service converter 280 converts the non-generic service 230 back into a generic service 225. Passivation may include renaming the non-generic service so that it has a generic service name, and may additionally include removing any object or specific service logic (or a reference to an object or specific service logic) from the non-generic service 230. Therefore, passivated non-generic services may be reused.

In one embodiment, passivation is performed on specific services when there are less than a threshold amount of available generic services (e.g., less than 5% of total running services are generic services). Passivation may also be performed periodically (e.g., every hour). When passivation is performed, specific services may be ranked based on their usage. Those specific services having the lowest levels of usage may be passivated. Enough specific services may be passivated to satisfy a threshold. For example, if the threshold is 40%, then enough specific services may be passivated to cause 40% of total running services to be generic services.

Note that passivation may also be performed on a case by case basis for services as those services become unused. For example, service converter 280 may periodically check to see when specific services have last been used. Any specific services that have not been used for a threshold amount of time (e.g., for an hour) may be passivated.

In one implementation, as part of passivation of a specific service, service converter 280 sends a destroy command to an object that includes the specific service logic for the specific service. The destroy command may cause that object to terminate.

Pseudocode for one example technique of passivating a non-generic service is provided below. This example is for an implementation in which servlets are used.

```
INPUT:
    -  servlet X
    -  usage profile USAGE(TIME), e.g. USAGE(13:30) will return
       number of requests in 1 hour time window from 12:30 -
       13:30.
OUTPUT:
    -  BOOLEAN - whether to passivate or not
PSEUDOCODE:
    -  Sort servlets in descending order of USAGE(NOW) to array
       SSERVLETS
    -  if size(SSERVLETS) exceeds 95% of polled capacity and X
       belongs to lower 40% servlet portion then RETURN TRUE
    -  Compute 3 consecutive time windows USAGE(NOW-3),
       USAGE(NOW-2), USAGE(NOW-1). If the usage drops and
       current usage is 0 then RETURN TRUE
    -  RETURN FALSE
```

Note that virtual machines 212-218 are described as each running on a different host machine 202-208. However, it should be understood that in alternative embodiments some or all of the virtual machines 202-208 may run on the same host machine (e.g., on host machine 202). Moreover, service pool 222, service converter 280, non-generic services 230, service logic extractor 242, directory service 235 and object 240 have been described as running within different virtual machines 212-218. However, it should be understood that some or all of these components may run within a single virtual machine (e.g., within virtual machine 212).

Figure 3:
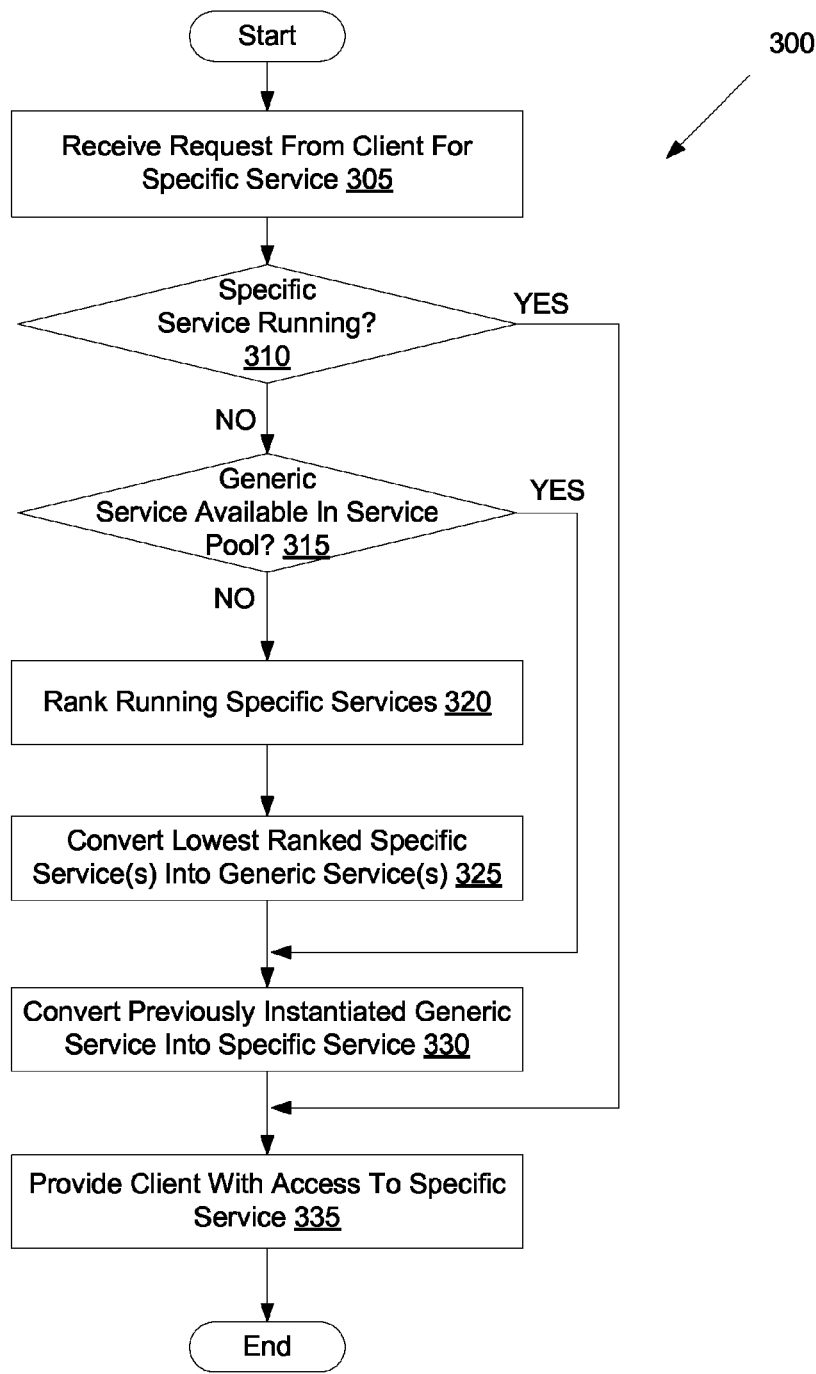
FIG. 3 is a flow diagram illustrating one embodiment of a method for provisioning a service.
Figure 4:
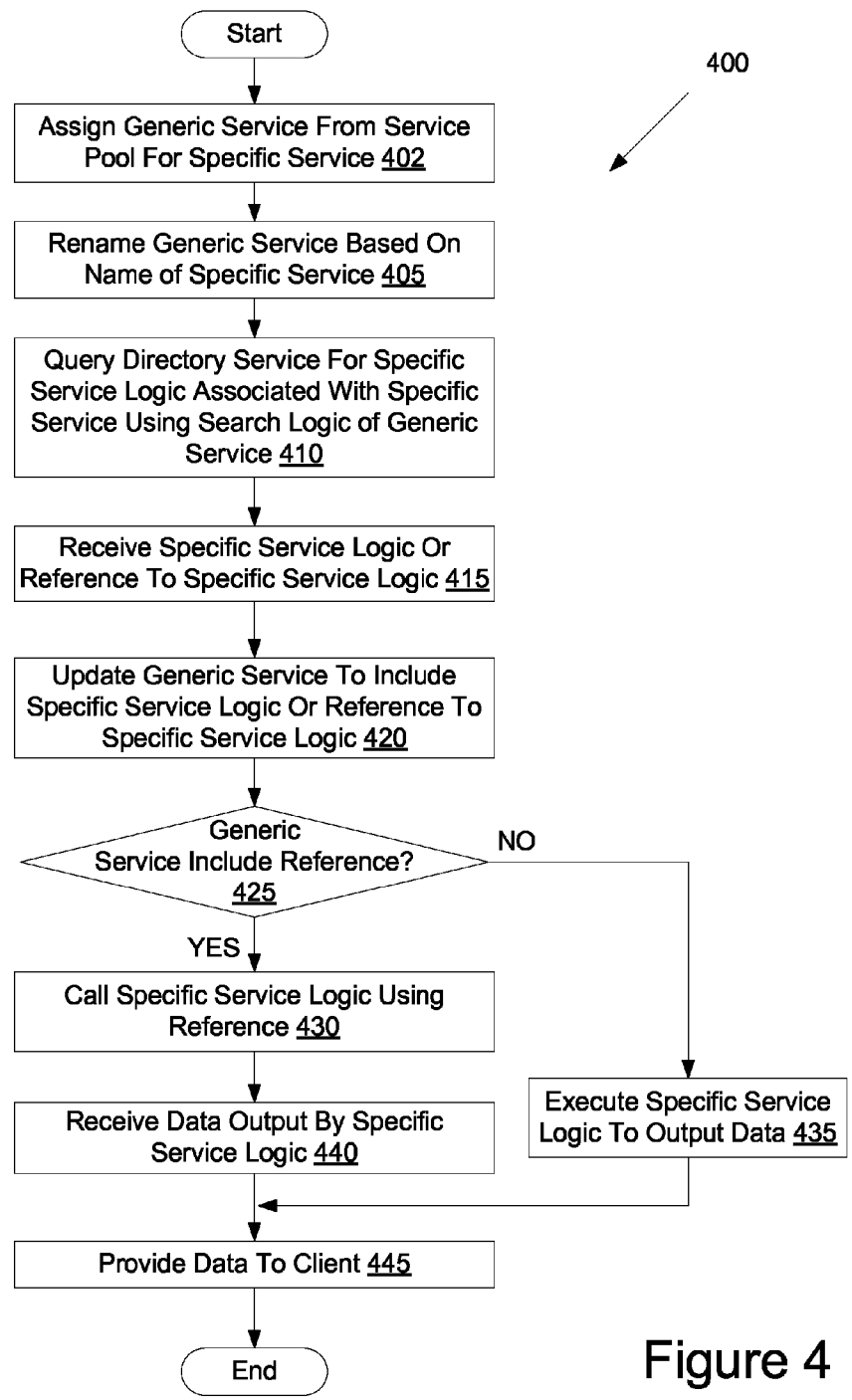
FIG. 4 is a flow diagram illustrating one embodiment of a method for converting a generic service into a specific service.

FIGS. 3-4 are flow diagrams showing various methods for managing a service pool of generic services and converting between generic services and specific services. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a servlet converter 280 of FIG. 2.

FIG. 3 is a flow diagram illustrating one embodiment of a method 300 for managing a service pool of generic services and converting between generic services and specific services. At block 305 of method 300, processing logic receives a request from a client for a specific service. At block 310, processing logic determines whether the specific service is running. If the specific service is running, the method proceeds to block 335. Otherwise, the method continues to block 315.

At block 315, processing logic determines whether there is an available generic service available in a service pool. If no such generic service is available, the method continues to block 320. If a generic service is available, the method proceeds to block 330.

At block 320, processing logic ranks a set of running specific services. Each of these specific services may have originally been generic services, and may have been converted into different specific services. The specific services may be ranked in descending order based on their utilization. Those specific services that are utilized the most may receive the highest ranking, while those specific services that are utilized the least may receive the lowest ranking.

At block 325, processing logic converts one or more of the lowest ranked specific services into generic services. In one embodiment, enough specific services are converted back into generic services to cause 20% of services to be generic services. Thus, up to the lowest 20% of specific services may be converted back into generic services. Other threshold values may be used instead. The conversion may be performed by renaming the specific services and/or removing specific service logic or references to specific service logic from the specific services.

Note that the operations of blocks 320 and 325 may also be performed at other times than when there are no generic services available. In one implementation, processing logic periodically checks a quantity of available generic services. If the quantity of available generic services is below a threshold, processing logic may perform the operations of blocks 320 and 325. For example, the threshold may be 95% of total capacity. In such an implementation, if 95% of services are specific services (and 5% are generic services), then the operations of blocks 320 and 325 may be performed.

At block 330, processing logic converts a previously instantiated generic service into a specific service. At block 335, processing logic provides the client with access to the specific service.

FIG. 4 is a flow diagram illustrating one embodiment of a method 400 for converting a generic service into a specific service. At block 402 of method 400, processing logic assigns a generic service from a service pool for a specific service. At block 405, processing logic renames the generic service based on a name of the specific service (e.g., based on a name of an application that includes the specific service).

At block 410, processing logic queries a directory service for specific service logic associated with the specific service using search logic of the generic service. The directory service may be a JNDI service, and the query may include a name of an application associated with the specific service logic.

At block 415, processing logic receives the specific service logic from the directory service. Alternatively, processing logic may receive a reference to the specific service logic (e.g., a reference to an object including the specific service logic). At block 420, processing logic updates the assigned generic service to include the specific service logic or a reference to the specific service logic.

At block 425, processing logic determines whether the generic service has been updated to include the specific service logic or a reference to the specific service logic. If the generic service has been updated to include a reference, the method continues to block 430. If the generic service has been updated to include the specific service logic (e.g., an object containing the specific service logic), the method proceeds to block 435.

At block 435, processing logic executes the specific service logic. This may include loading an instance of an object having the specific service logic. The specific service logic may produce output data as a result of the execution.

At block 430, processing logic calls the specific service logic using the reference. An object including the specific service logic running in a different virtual machine and/or a different host machine may be called. At block 440, processing logic receives data output by the specific service logic.

At block 445, processing logic provides the output data to a client.

Figure 5:
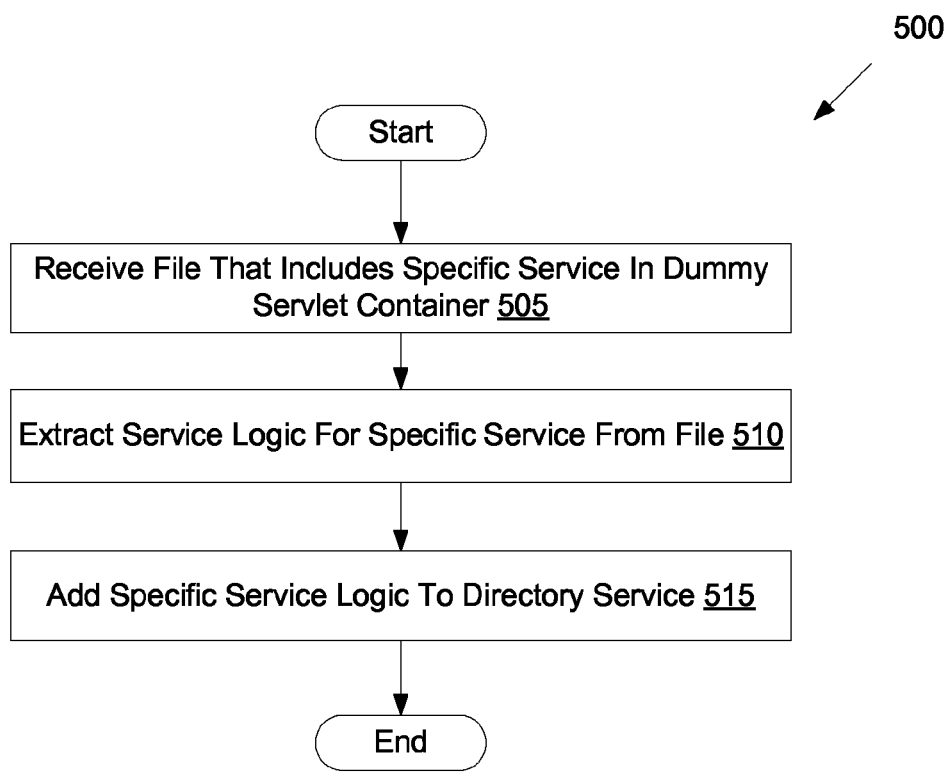
FIG. 5 is a flow diagram illustrating one embodiment of a method extracting logic for a specific service.

FIG. 5 is a flow diagram showing a method 500 for extracting specific service logic from a specific service. The method 500 may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of method are performed by a service logic extractor 242 of FIG. 2.

Referring back to FIG. 5, at block 505 of method 500 processing logic receives a file that includes a specific service. In one embodiment, the specific service is inserted by a client or tenant into a dummy servlet container. At block 510, processing logic extracts service logic for the specific service from the file. At block 515, processing logic adds the specific service logic for the specific service to a directory service (e.g., to an JNDI service). The specific service logic may then be available for use by any generic service.

Figure 6:
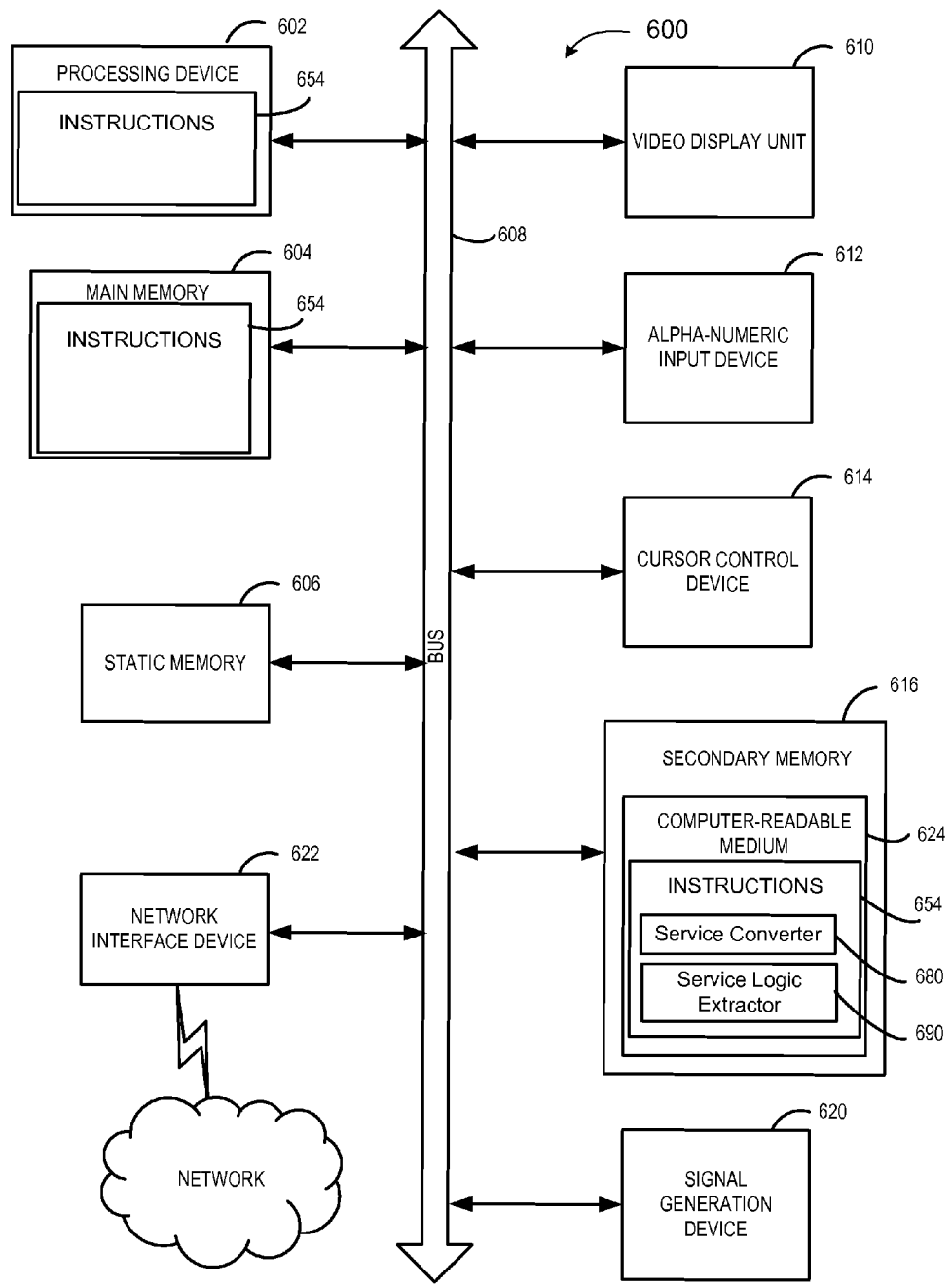
FIG. 6 illustrates a block diagram of one embodiment of a computing device.

FIG. 6 illustrates an example computing device, in accordance with implementations described herein. The computing device 600 may correspond to a host machine 202-208 of FIG. 2. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computing device 600 may further include a network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., service converter 680 and/or service logic extractor 690). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "assigning", "renaming", "updating", "querying", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device, a request from a client for an application associated with a specific servlet;
   responsive to determining that the specific servlet is not running on a virtual machine, converting a previously instantiated generic servlet into the specific servlet by the processing device, the converting comprising:
   assigning the generic servlet from a servlet pool for the specific servlet, the generic servlet comprising search logic;
   renaming the generic servlet in view of a name of the application;
   querying, using the search logic, a Java naming directory interface (JNDI) for specific service logic associated with the specific servlet;
   receiving a reference to the specific service logic from the JNDI; and
   updating the generic servlet to include at least one of the specific service logic or the reference to the specific service logic;
   determining that there are fewer than a threshold quantity of available generic services;
   ranking non-generic services in view of usage of the non-generic services, the specific service being one of the non-generic services; and
   converting the specific service back into the generic service responsive to making a determination that the specific service has a rank below a rank threshold.

2. The method of claim 1, further comprising: calling the specific service logic using the reference;
   receiving data output by the specific service logic; and
   providing the data to the client.

3. The method of claim 1, further comprising:
disposing resources associated with the specific logic.

4. The method of claim 1, further comprising:
receiving a file comprising the specific servlet;
   extracting the specific service logic for the specific servlet from the file; and
   adding the specific service logic to the JNDI.

5. The method of claim 4, wherein the file is a web application archive (WAR) file, and wherein extracting the specific service logic comprises:
   identifying in the file first logic having a hypertext transport protocol (HTTP) request method designator annotation;
   identifying second logic not having a hypertext transport protocol (HTTP) request method designator annotation; and
   extracting the first logic from the file without extracting the second logic, the first logic comprising the specific service logic.

6. A non-transitory computer readable storage medium having instructions that, when executed by a processing device, cause the processing device to:
   receive, by the processing device, a request from a client for a specific service;
   responsive to determining that the specific service is not running a virtual machine, convert a previously instantiated generic service into the specific service by the processing device, wherein to convert, the processing device is further to:
      assign the generic service from a service pool for the specific service;
      rename the generic service in view of a name of the specific service;
      query a directory service for specific service logic associated with the specific service;
      receive at least one of the specific service logic or a reference to the specific service logic from the directory service; and
      update the generic service to include at least one of the specific service logic or the reference to the specific service logic;
   determine that there are fewer than a threshold quantity of available generic services;
   rank non-generic services in view of usage of the non-generic services, the specific service being one of the non-generic services; and
   convert the specific service back into the generic service responsive to making a determination that the specific service has a rank below a rank threshold.

7. The non-transitory computer readable storage medium of claim 6, wherein the processing device is further to:
   call the specific service logic using the reference;
   receive data output by the specific service logic; and
   provide the data to the client.

8. The non-transitory computer readable storage medium of claim 6, wherein:
   the generic service is one of a generic Java software API for RESTful Web Services (JAX-RS) service or a generic servlet and the specific service is one of a specific JAX-RS service or a specific servlet;
   the specific service logic executes within a Java virtual machine (JVM); and
   the directory service is accessible via a Java naming directory interface (JNDI).

9. The non-transitory computer readable storage medium of claim 6, wherein the processing device is further to:
   dispose resources associated with the specific logic.

10. The non-transitory computer readable storage medium of claim 6, wherein the processing device is further to:
receive a file comprising the specific service;
   extract the specific service logic for the specific service from the file; and
   add the specific service logic to the directory service.

11. The non-transitory computer readable storage medium of claim 10, wherein the file is a web application archive (WAR) file, and wherein to extract the specific service logic, the processing device is further to: identify in the file first logic having a hypertext transport protocol (HTTP) request method designator annotation;
   identify second logic not having a hypertext transport protocol (HTTP) request method designator annotation; and
   extract the first logic from the file without extracting the second logic, the first logic comprising the specific service logic.

12. A computing device comprising:
a memory; and
a processing device operatively coupled to the memory, the processing device to:
   receive a request from a client for a specific service;
   responsive to determining that the specific service is not running on a virtual machine, convert a previously instantiated generic service into the specific service by the processing device, wherein to convert, the processing device is further to:
      assign the generic service from a service pool for the specific service;
      rename the generic service in view of a name of the specific service;
      query a directory service for specific service logic associated with the specific service;
      receive at least one of the specific service logic or a reference to the specific service logic from the directory service; and
      update the generic service to include at least one of the specific service logic or the reference to the specific service logic
   determine that there are fewer than a threshold quantity of available generic services;
   rank non-generic services in view of usage of the non-generic services, the specific service being one of the non-generic services; and
   convert the specific service back into the generic service responsive to making a determination that the specific service has a rank below a rank threshold.

13. The computing device of claim 12, wherein the processing device is further to:
   call the specific service logic using the reference;
   receive data output by the specific service logic; and
   provide the data to the client.

14. The computing device of claim 12, wherein:
   the generic service is one of a generic Java software API for RESTful Web Services (JAX-RS) service or a generic servlet and the specific service is one of a specific JAX-RS service or a specific servlet;
   the specific service logic executes within a Java virtual machine (JVM); and
   the directory service is accessible via a Java naming directory interface (JNDI).

15. The computing device of claim 12, wherein the processing device is further to: dispose resources associated with the specific logic.

16. The computing device of claim 12, wherein the processing device is further to: receive a file comprising the specific service;
 extract the specific service logic for the specific service from the file; and
 add the specific service logic to the directory service.

17. The computing device of claim 16, wherein the file is a web application archive (WAR) file, and wherein to extract the specific service logic, the processing device is further to:
 identify in the file first logic having a hypertext transport protocol (HTTP) request method designator annotation;
 identify second logic not having a hypertext transport protocol (HTTP) request method designator annotation; and
 extract the first logic from the file without extracting the second logic, the first logic comprising the specific service logic.

* * * * *